US008069794B2

(12) United States Patent
Satloff et al.

(10) Patent No.: US 8,069,794 B2
(45) Date of Patent: Dec. 6, 2011

(54) PORTABLE COMPUTER DESK WITH POWER GENERATOR

(76) Inventors: Theodore J. Satloff, New York, NY (US); James E. Satloff, New York, NY (US)

( * ) Notice: Subject to any disclaimer, the term of this patent is extended or adjusted under 35 U.S.C. 154(b) by 537 days.

(21) Appl. No.: 12/315,326

(22) Filed: Dec. 2, 2008

(65) Prior Publication Data
US 2009/0260548 A1    Oct. 22, 2009

Related U.S. Application Data

(60) Provisional application No. 61/125,100, filed on Apr. 22, 2008.

(51) Int. Cl.
*A47B 37/00* (2006.01)
(52) U.S. Cl. ............... 108/50.02; 310/15; 310/20
(58) Field of Classification Search ........... 108/50.02, 108/50.01, 115, 20; 312/194, 195, 223.3, 312/223.6, 258, 262, 259, 208.5, 21; 310/15, 310/20, 23
See application file for complete search history.

(56) References Cited

U.S. PATENT DOCUMENTS

| | | | | |
|---|---|---|---|---|
| 184,160 | A | * | 11/1876 | Liebert .................. 312/208.5 |
| 943,236 | A | * | 12/1909 | Campbell .................... 108/115 |
| 1,291,819 | A | * | 1/1919 | Fogel et al. ..................... 310/23 |
| 2,171,318 | A | * | 8/1939 | Torines ........................... 312/30 |
| 2,222,318 | A | * | 11/1940 | McLauthlin .................. 312/200 |
| 3,068,821 | A | * | 12/1962 | Hermanns ..................... 112/260 |
| 3,286,869 | A | * | 11/1966 | Krein et al. .................. 217/12 R |
| 4,507,579 | A | * | 3/1985 | Turner ............................ 310/23 |
| 5,058,965 | A | * | 10/1991 | Thorn ........................... 312/231 |
| 5,077,515 | A | * | 12/1991 | St. Arnauld ...................... 322/4 |
| 5,637,936 | A | * | 6/1997 | Meador ........................... 310/24 |
| 6,176,813 | B1 | * | 1/2001 | Shu et al. .......................... 482/4 |
| 2009/0062072 | A1 | * | 3/2009 | Packham ........................... 482/4 |

OTHER PUBLICATIONS

Ben Erickson, "Pedal Power: Spinning for the Future at CCAT", Oct. 14, 2007, <http://www.green-trust.org/2000/humanpower.htm>.*
Scienceshareware.com, Bike Generator Frequently Asked Questions, Nov. 14, 2007, Copyright 2006, <http://www.scienceshareware.com/bicycle-generator-faq.htm>.*

* cited by examiner

*Primary Examiner* — Darnell Jayne
*Assistant Examiner* — Andres F Gallego
(74) *Attorney, Agent, or Firm* — Karl F. Milde, Jr.; Eckert Seamans Cherin & Mellott, LLC

(57) ABSTRACT

A portable desk with a generator for providing electrical power to a computer or other electrical device that is collapsibly foldable to a compact form wherein successive sections comprise a back panel, a desk top panel hinged from the top edge of the back panel, two side panels hinged from the side edges of the back panel, two bottom panels hinged from the bottom edges of the side panels and two movable foot treadle panels hinged to the bottom edge of the back panel. The generator is removably attached to the top panel and is connected to the foot treadles so the generator is operated by actuating the foot treadles. The power generator comprises an electrical connection, such as a USB connector, for a computer or other electrical device.

16 Claims, 5 Drawing Sheets

PORTABLE COMPUTER DESK WITH POWER GENERATOR

CROSS REFERENCE TO RELATED APPLICATIONS

This application claims priority from U.S. provisional application No. 61/125,100, filed Apr. 22, 2008.

BACKGROUND OF THE INVENTION

The present invention relates to an inexpensive, foldable table having a manually operated generator for powering an electrical or electronic device and, more particularly, a computer.

Recently it has been proposed that inexpensive computers, including laptop computers, be made available to students and individuals around the world and particularly in "third world" countries. It is believed that the distribution of such computers would significantly help raise the literacy and educational levels in those countries, eventually resulting in an economic benefit to the country itself. This would particularly apply if the computers were capable of accessing the Internet. To that end, U.S. industry is currently implementing plans to manufacture and distribute such computers.

It appears then that the distribution of these computers would create a problem in that there may be few or no sources of electricity readily available for providing power for the computers, particularly in rural areas. Whatever power sources as may be available might be some distance away from where it is needed, requiring the computer operator to travel great distances in order to find a power source to operate the computer or charge the batteries. Multiple sources of electricity would be helpful, so that students could power their computers at home as well as school and in remote locations.

Accordingly, there arises a need for a lightweight, portable and inexpensive power source for powering computers in remote areas where electricity may not be available. Electrical sources such as solar panels and rechargeable storage batteries have obvious drawbacks. Both of these sources would be prohibitively costly, with the added problem that batteries might be too bulky and heavy, and not easily transported. Electrical generators operated by motors such as gasoline engines similarly would not be economical or portable.

Thus, there is a need for a source of electrical power generator that relies on manual operation. Because computers are operated by a user's hands, it is desirable that the generator be manually operated by the user's foot or feet.

There is also a need for a lightweight, portable and inexpensive table on which to place the computer during operation. Such table would need to be collapsible for ease of transporting.

OBJECTS OF THE INVENTION

It is therefore a principle object of the invention to provide an inexpensive and portable power generator for a computer.

It is also an object of the invention to provide a power source that is manually operated by the computer operator's feet.

It is a further object of the invention to provide the generator in conjunction with a computer table that is also inexpensive and foldable or collapsible to provide ease of portability.

It is another object of the invention to provide a mechanism in connection with the table to operate the generator.

These and other objects of the invention will become more apparent in the description below.

SUMMARY OF THE INVENTION

A principle object of the present invention is to provide a relatively simple, portable and inexpensive, manually-operated generator for providing electrical power to a computer. A further principle object of this invention is to provide a manually-operated generator in conjunction with a support, or table, for the computer such that they can be easily transported together along with the computer.

In accordance with the invention, a collapsible and foldable computer table is provided that is made from inexpensive and lightweight material. The table comprises a mechanism in the form of foot treadles for operating an electrical generator which is attached to the table preferably at the underside of the top.

The present invention therefore provides a foldable table configured from a single flat sheet of material with successive hinged panels. Specifically, the table has a back panel and a top panel that is hinged from the top edge of the back, to be folded forwardly and downward to form the top surface for placing the computer. Left and right side panels are hinged on the left and right side edges of the back panel. The side panels fold inwardly and forward to form the sides of the table. The side panels also function as table legs and support the top panel, which rests on top of the side panels when the table is assembled.

Each side panel also has a hinged bottom panel along the bottom edge of side panel. The bottom panels are folded upward to form the bottom of the table. When the side panels are in their proper position, the bottom panels meet and form a complete bottom section of the table.

The back panel also has two separate foot treadle panels hinged side-by-side to the bottom edge of the back panel. When the table is assembled, the foot treadle panels are positioned inside the table, at the bottom, so that they can be operated by the user's feet in an up-and-down reciprocal motion. The foot treadles are attached by a flexible cable, cord or similar means, to a mechanism for operating the generator, as further described below. When assembled, the invention provides a table that has very good strength and functionality. When collapsed, are the panels are folded together, which can again be folded in half, to form a compact package that be easily stored or transported.

The generator may be any generator capable of being manually operated by means of a reciprocal motion such as provided by the up-and-down motion from the foot treadles. In an embodiment of the invention, a generator comprises an elongated stationary coil having a movable magnet inside. The magnet is connected by a rod to a wheel having an eccentric. The flexible cable is placed circumferentially around the wheel, so that when the foot treadles are operated sequentially, the wheel turns in one direction and then the other. The circular motion of the wheel is translated to reciprocal motion by the eccentric at the edge of the wheel, to which one end of the connecting rod is attached. The reciprocal movement of the magnet inside the coil generates electricity, which is regulated to the proper voltage by means of electronic circuitry that would be apparent to one of skill in the art, such as a rectifier and a capacitor. The electronic circuitry includes a connecter, such as a USB port, for providing the electrical current to the computer. In this manner, the generator can operate the computer directly or can be used to charge the computer's batteries.

Thus, the present invention provides means for providing electrical power to a computer while also providing a solid table for support for the computer that is inexpensive, easy to operate and easy to transport or store.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Figure 1:
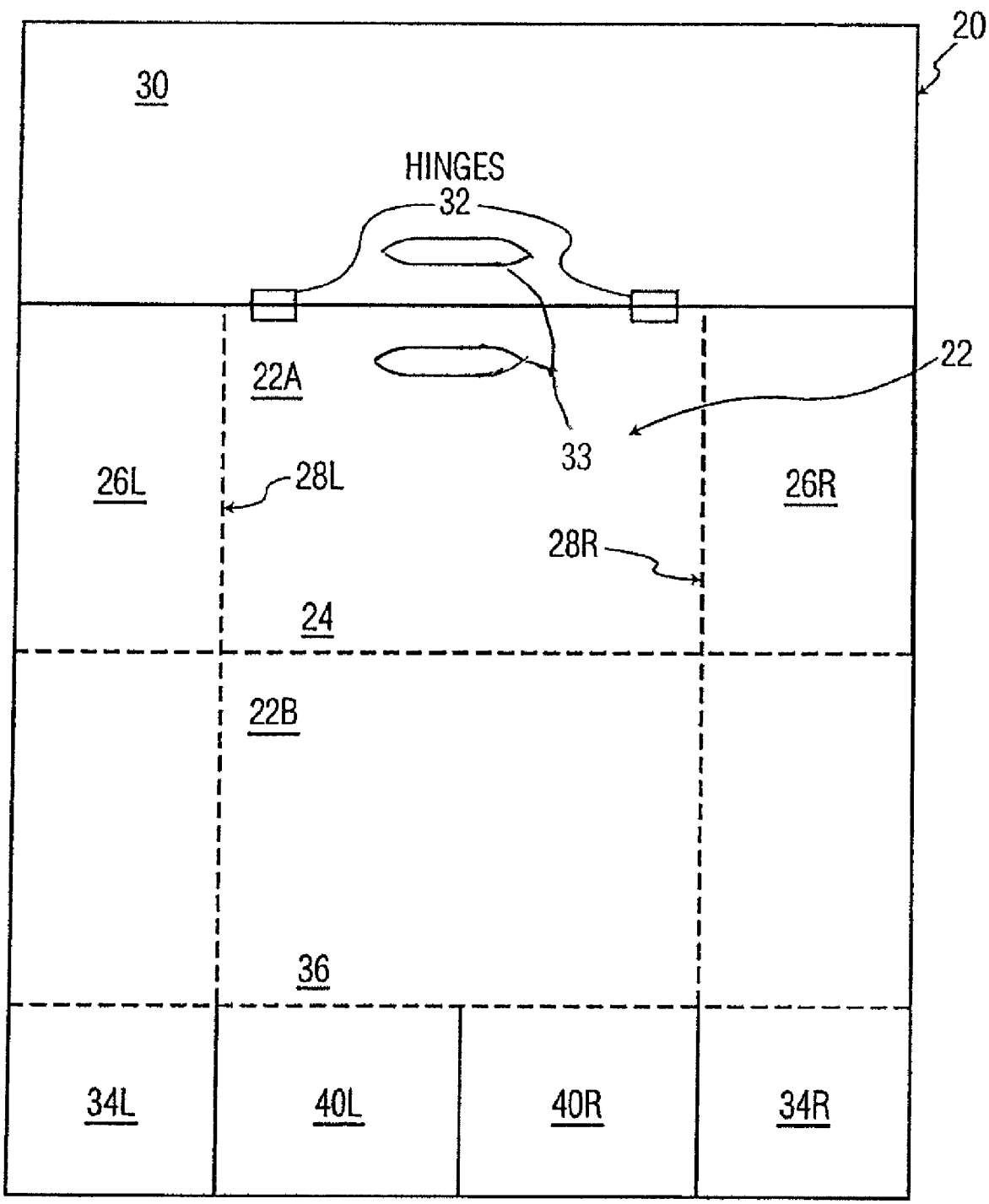
FIG. 1 is a front view of an unfolded table in accordance with an embodiment of the present invention.

The preferred embodiments of the present invention will now be described with reference to FIGS. 1-5 of the drawings. Identical elements in the various figures are designated with the same reference numerals. The various embodiments of the invention described below are preferably made from inexpensive, lightweight but sturdy material including recycled plastic, particle board, masonite or corrugated metal.

A table 10, having features which make it particularly suited for users of computers is described. It will be understood how other furniture products comprising support side support panels or legs and a top working surface may embody the principles and features of this invention.

Figure 2:
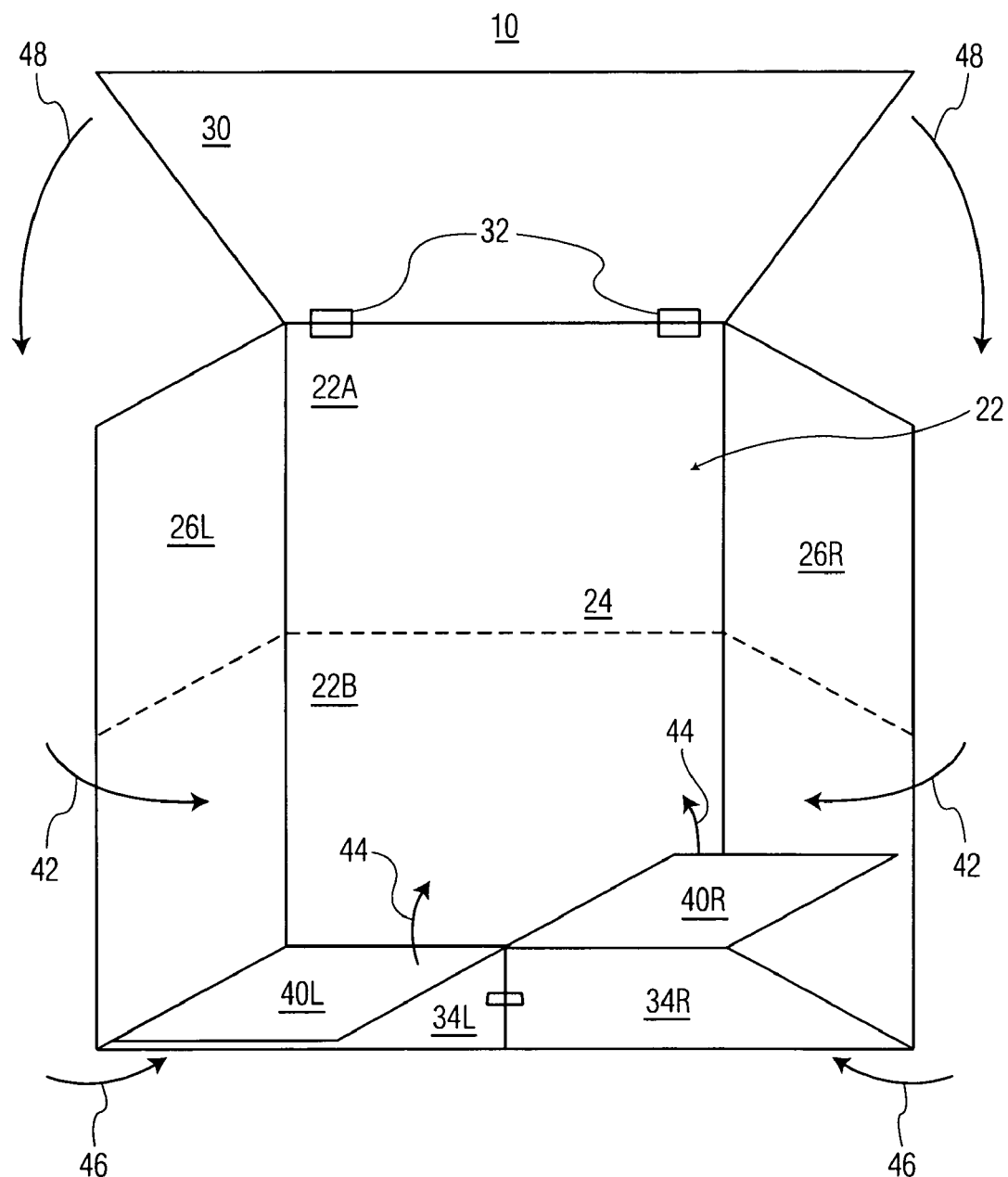
FIG. 2 is a view of the manner of assembly of a table in accordance with an embodiment of the present invention.
Figure 3:
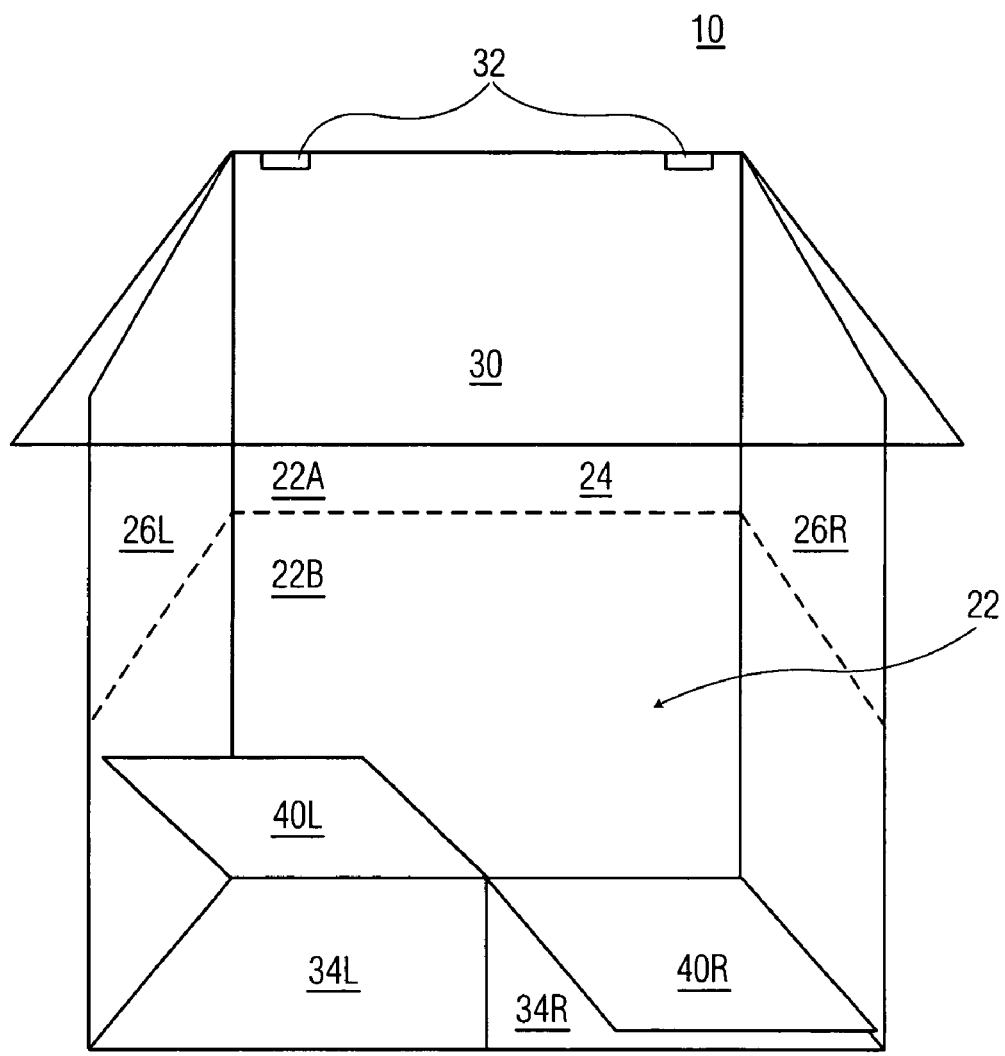
FIG. 3 is a perspective view of an assembled preferred embodiment of the present invention.

With reference to the drawings and in particular FIGS. 1-3 initially, which illustrate a preferred embodiment of a computer table according to the invention, generally designated by the reference number 10. FIG. 1 provides a view of the unfolded table 10 as a single sheet 20 of foldable material, that is foldable to assemble the table 10 as a three dimensional table. Forming the table 10 from a single sheet of material provides for ease of manufacturing and results in low cost to the user. The broken lines indicate where sheet 20 is folded and the solid lines indicate where the sheet 20 is cut to create separate panels of the table 10.

The table 10 comprises a back panel 22, shown as two sections 22A and 22B, which are above and below fold line 24. Fold line 24 allows table 10 to be folded into a single, compact form when totally collapsed for storage or for transporting. Left and right side panels, 26L and 26R, are foldably attached to the left and sides of back panel 22, and are foldable along fold lines 28L and 28R. A top panel 30 is hinged along the top edge of back panel 22. As shown, top panel 30 is connected to back panel 22 by hinges 32. Alternatively, top panel 30 may also be attached to back panel 22 and folded along a fold line similar to side panels 26L and 26R. The table further comprises a carrying handle (not shown) at one edge. Openings 33 serve to provide a convenient carrying handle for the panel when folded.

At the bottom edge of side panels 26L and 26R are two bottom panels 34L and 34R, each of which forms half of the bottom of table 10 when it is assembled. Foldable along fold line 36, when side panels 26L and 26R are in assembled position, bottom panels 34L and 34R are met to form the bottom to table 10. See FIG. 2. Once they are adjacent to each other, bottom panels 34L and 34R can be joined together by means such as a Velcro® connector, or simply a piece of string or wire.

Table 10 also has left and right treadle panels, 40L and 40R, pivotally attached at the left and rights sides of the bottom edge of back panel 22. As shown, left and right treadles 40L and 40R are foldable along fold line 36, but can also be attached to back panel 22 using hinges (not shown) in the same manner as top panel 30. When assembled, the foot treadles 40L and 40R are pivotally operable by the user's feet.

FIGS. 2 and 3 illustrate the assembly of table 10, with FIG. 3 showing the completed assembly. Referring to FIG. 2, table 10 is foldably assembled by inwardly folding side panels 26L and 26R as designated by arrows 42. However, treadles 40L and 40R must first be folded upward as indicated by arrows 44, and bottom panels 34L and 34R must also be folded upward as indicated by arrows 46. Once the side panels 26L and 26R are folded inwardly, bottom panels 34L and 34R meet together, and can be attached together by any common, and removable, attachment means 38, such as string, wire, tape, Velcro® or similar material. When bottom panels 34L and 34R are joined, foot treadles 40L and 40R are in position above the bottom panels, so that the foot treadles 34L and 34R become located inside table 10. Lastly, when the side panels 26L and 26R are in place, top panel 30 is folded downwardly as indicated by arrows 48, until it rests on top of the side panels which, together with back panel 22A&B, also function as legs for the table 10. FIG. 3 illustrates the fully assembled table 10 of this embodiment of the invention.

Foot treadles 40L and 40R are connected to a manually operated generator assembly 50 by means of a flexible cord or cable 52, which can be made of braided or single wire, rubber, rope, string, monofilament nylon line or any material of similar flexibility and strength. The flexible cord 52 is attached to the treadles at the ends 54L and 54R opposite the treadles' attachment to the back panel so that the up-and-down movement (see arrow 56) of the treadles provides maximum travel for cord 52.

Figure 4:
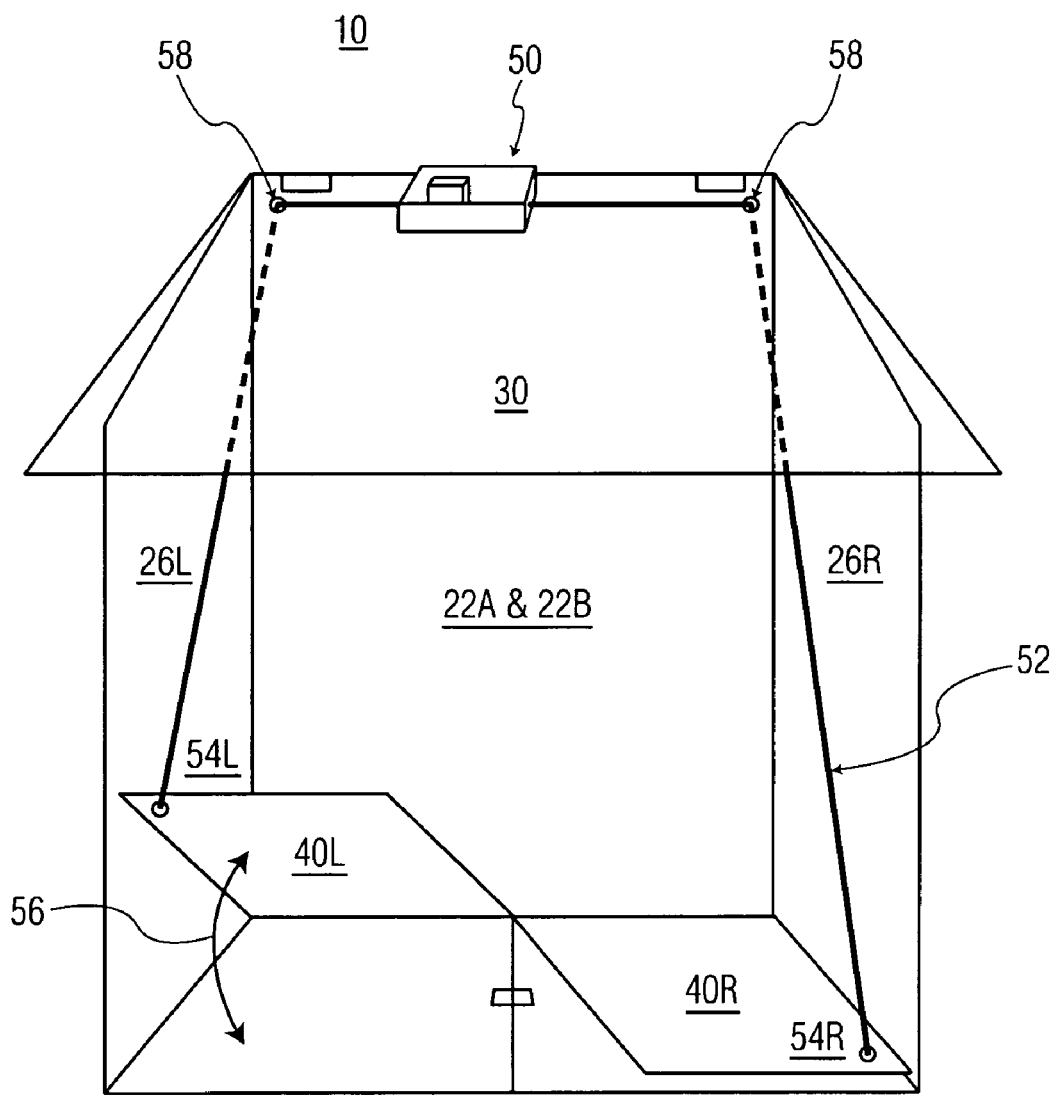
FIG. 4 is a further detailed view of the preferred embodiment of the invention shown in FIG. 2.

Cord 52 is a single, continuous cord having two ends, where one end of the cord 52 is attached to each of treadles 40L and 40R. As shown in the embodiment of FIG. 4, cord 52 passes through openings 58 in the top panel 30 and then through generator assembly 50. In this embodiment, generator 50 is removably attached to the outside of top panel 30. However, alternative locations for generator assembly 50 can be envisioned. For example, generator assembly 50 can also be located inside table 10, and be attached to the underside of top panel 30.

Figure 5:
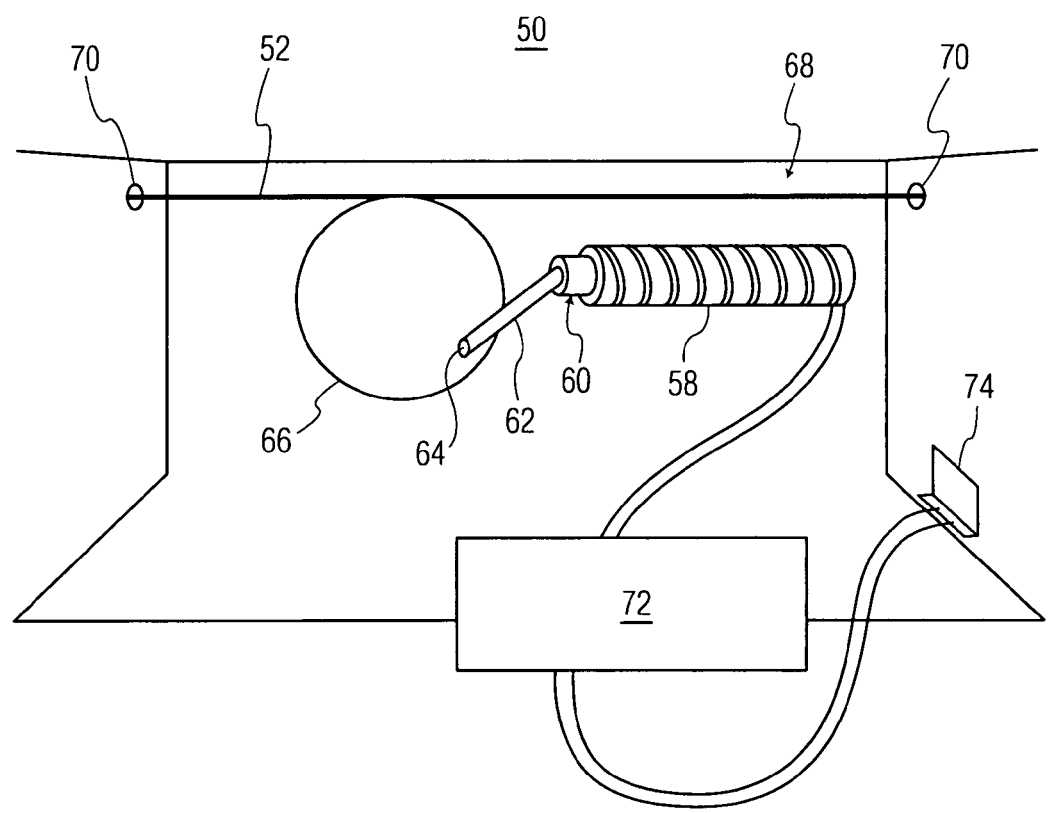
FIG. 5 is a diagram of a generator of a preferred embodiment of the invention.

FIG. 5 further illustrates a preferred embodiment of the generator assembly 50 of the invention. Generator assembly 50 is located inside generator housing 68 and comprises a coil 58 and a magnet 60. In this preferred embodiment, coil 58 is in the form of a cylinder, having a length that would be sufficient to generate the desired amount of electricity. Magnet 60 is in the shape of a rod having a length similar to coil 58, is positioned inside of coil 58 and is reciprocally movable inside coil 58. One end of magnet 60 is attached to connecting rod 62, which in turn is connected to eccentric 64 on the outer circumference of wheel 66. Wheel 66 is rotationally attached to generator housing 68.

As shown in FIG. 5, cord 52 passes inside of housing 68 through openings 70, and is wrapped around the circumference of wheel 66. In operation, the up and down motion of the treadles 40L and 40R creates alternating lateral motion of the cord 52 inside the housing 68, which causes wheel 66 to rotate first in one direction and then the other. The alternating circular motion of wheel 66 is translated to reciprocal lateral motion of the magnet 60 through its connection to wheel 66 at eccentric 64. The reciprocal motion of magnet 60 inside coil 58 generates electrical current which is modified by electronic circuitry 72 to the desired voltage and amperage. Such electronic circuitry would be apparent to one of skill in the art, and would include at least a rectifier and a capacitor. Modifications to such circuitry would also be known to one of skill in the art and would vary according to the desired use. The electronic circuitry is connected to an outlet 74, such as an USB socket, for connecting the computer or other electronic device. In this manner, the apparatus of this invention provides electrical power to operate a computer or charge the computer's batteries.

The preceding preferred embodiments are illustrative of the practice of the invention. It is to be understood, however, that other expedients known to those of skill in the art, or disclosed herein, may be employed without departing from the spirit of the invention or the scope of the claims.

What is claimed is:

1. An apparatus for providing electrical power to a computer or other electrical device, comprising:
   a manually operable generator for providing electrical power;
   a desk comprising a top surface portion, side portions a back portion, and and two foot treadles foldably attached to a bottom edge of said back portion and thereby pivotally mounted pivotally mounted underneath said top surface portion and between said side portions;
   connecting means for connecting the foot treadles to the generator such that the foot treadles move alternately up and down to drive the generator;
   whereby the up and down motion of the foot treadles provides mechanical movement which operates the generator to produce electrical energy.

2. The apparatus of claim 1, wherein said desk is foldable and collapsible for ease of transport.

3. The apparatus of claim 1, wherein said generator is removably mounted to said desk.

4. The apparatus of claim 1, wherein said generator comprises a coil and a magnet adjacent to said coil, and wherein reciprocal movement of the magnet and the coil with respect to each other generates electricity.

5. The apparatus of claim 4, wherein the connecting means comprises a flexible cord connected from the foot treadles to the generator such that up and down motion of the foot treadles causes the reciprocal movement of the generator.

6. The apparatus of claim 1, further comprising an electric circuit for electrically connecting the generator to a computer or other electrical device.

7. The apparatus of claim 6, wherein said electric circuit comprises a USB port.

8. The apparatus of claim 4, wherein said connecting means includes a wheel having an eccentric, a rod connecting to said eccentric to said magnet for creating reciprocal motion of said magnet upon rotation of the wheel, and a flexible cord connected from the foot treadles to the wheel for rotation of the wheel.

9. The apparatus of claim 8, wherein the wheel is rotated alternately clockwise and counterclockwise by the up and down motion of the food treadles.

10. A portable desk having a manually operated generator for providing electrical power to a computer or other electrical device, comprising;
    a foldable desk comprising a top surface portion, left and right side portions, and a back portion, wherein said top, left and right side portions are foldably attached to said back portion;
    a left treadle foldably attached to a bottom edge of said back portion;
    a right treadle foldably attached to a bottom edge of said back portion;
    wherein the foldable desk may be configured to form a box having a top, sides and back, and an open side having the two treadles accessible to be manually moved up and down;
    an electrical power generator removably attached to one of the portions of said foldable desk, said power generator comprising;
    a coil;
    a magnet located inside said coil, such that when said magnet is moved reciprocally inside coil, electrical energy is generated;
    reciprocating means connected to said magnet for creating reciprocating motion of said magnet;
    an electric circuit connected to said coil for controlling the voltage applied to an output terminal; and
    means for connecting said left and right treadles to said reciprocating means;
    whereby, operating said left and right treadles in an up and down motion causes said reciprocating means to move the magnet back and forth inside said coil to generate electrical energy.

11. The portable desk of claim 10, wherein said portions of the desk may be folded together for ease of carrying.

12. The portable desk of claim 11, further comprising a carrying handle at one edge.

13. The portable desk of claim 10, wherein said means for connecting said left and right treadles to said reciprocating means comprises a flexible cord.

14. The portable desk of claim 13, wherein said reciprocating means comprises a wheel mounted on an axis connected to said back portion of the foldable desk, wherein said flexible cord is circumferentially positioned around said wheel such that operation of said left and right treadles creates reciprocating circular motion in said wheel, causing reciprocal motion in said magnet in generating electrical energy.

15. The portable desk of claim 10, wherein said electric circuit comprises an electrical connector for connecting said electric circuit to a computer or other electrical device.

16. The portable desk of claim 15, wherein said electrical connector comprises a USB port.

* * * * *